US006970609B2

(12) United States Patent
Sakai et al.

(10) Patent No.: US 6,970,609 B2
(45) Date of Patent: Nov. 29, 2005

(54) IMAGE RETRIEVAL SYSTEM, METHOD AND IMAGE RETRIEVAL PROGRAM

(75) Inventors: Kenichiro Sakai, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 738 days.

(21) Appl. No.: 09/947,758

(22) Filed: Sep. 7, 2001

(65) Prior Publication Data

US 2002/0122607 A1 Sep. 5, 2002

(30) Foreign Application Priority Data

Mar. 5, 2001 (JP) ............................ 2001-059431

(51) Int. Cl.[7] .......................... G06K 9/54; H04N 5/225

(52) U.S. Cl. .................................... 382/305; 348/207.1

(58) Field of Search ............................... 382/305, 313, 382/229, 315; 348/207.1, 207.11; 707/100; 710/65; 358/1.15

(56) References Cited

U.S. PATENT DOCUMENTS 5,574,804 A * 11/1996 Olschafskie et al. ........ 382/313
5,778,405 A * 7/1998 Ogawa ....................... 715/532
5,804,803 A * 9/1998 Cragun et al. .............. 235/375
6,002,387 A * 12/1999 Ronkka et al. ............. 345/157
6,154,214 A * 11/2000 Uyehara et al. ............ 715/863
6,304,313 B1 * 10/2001 Honma ........................ 355/18
6,334,003 B1 * 12/2001 Yokota ....................... 382/313
6,444,482 B1 * 9/2002 Weimer et al. ............... 438/10
6,642,959 B1 * 11/2003 Arai ........................ 348/231.3

OTHER PUBLICATIONS

Patent Abstracts of Japan of JP 2000-201261 A and related U.S. Appl. No. 09/351,235.

* cited by examiner

*Primary Examiner*—Kanjibhai Patel
(74) *Attorney, Agent, or Firm*—Staas & Halsey LLP

(57) ABSTRACT

Hand-held information equipment provided integrally with an image reader reads out image data of a data storage unit by means of a retrieval data creation requesting unit and sends them to an information processor. The information processor converts the image data into text data for retrieval by means of a character recognition unit and creates indexes by means of an index creation unit. On receipt of thus created text data and indexes, the hand-held information equipment combines the text data and indexes with the image data for entry into a data storage unit by means of a retrieval data entry unit.

16 Claims, 12 Drawing Sheets

IMAGE RETRIEVAL SYSTEM, METHOD AND IMAGE RETRIEVAL PROGRAM

BACKGROUND OF THE INVENTION

1. Field of the Invention

The present invention relates generally to an image retrieval system, method and an image retrieval program in which text data and/or indexes are created for retrieval from images stored in a hand-held information equipment, and more particularly to an image retrieval system, method and an image retrieval program enabling an image retrieval based on the text data and/or indexes to be effected in a hand-held information equipment having no character recognition function.

2. Description of the Related Arts

Of late years, small-sized and lightweight hand-held information equipment is widely prevailing which allows an image display on a small-sized liquid crystal display mounted thereon. Such hand-held information equipment is known from Japan Patent Laid-open Pub. No. 2000-201261 which discloses one provided integrally with an image reader. Such image reader-integrated hand-held information equipment is able to readily read and save, in the form of images, photographs, maps, articles, etc., from newspapers or magazines. In the event of a drive for example, required images of maps, guide articles, etc., of the destination may be stored in advance so that the images can readily be referred to in the course of drive to the destination. Image fetch into the hand-held information equipment may be effected by use of a memory card, an electronic mail, a facsimile, a hand-held scanner, a digital camera, etc., in lieu of the integrated image reader.

By the way, such hand-held information equipment is daily used with a multiplicity of images saved as needed. In case of searching a desired image from among a multiplicity of images, images having individual features such as scenes, persons or maps can relatively easily be retrieved since they are readily distinguishable from other images even on the small display of the hand-held information equipment. In case of documentary images, however, it is difficult to visually distinguish them from others, making it effective to retrieve them from the contents of the documents by use of a keyword. In order to retrieve the documentary images by use of the keyword, it is necessary to recognize characters from the documentary images for conversion into text data and extract words as the keyword from the text to create an index.

However, the hand-held information equipment has a lower processing performance and a restricted storage capacity as compared with the personal computer or other information processor, so that addition of the character recognition function may induce an increase in the storage capacity and therefore in costs, which may impair the advantage of its small-sized and lightweight. That is, a dictionary for recognition is needed for the character recognition, and there is a need for a multiplicity of memories to be mounted for storage of the dictionary, which results in an increase of costs.

Due to the restrained processing performance of the processor mounted in the hand-held information equipment, it is quite time consuming to extract characters from images to execute the character recognition and further to execute the index creation.

SUMMARY OF THE INVENTION

It is therefore the object of the present invention to provide an image retrieval system, an image retrieval method and an image retrieval program ensuring an easy keyword retrieval of images including documents.

In order to attain the above object, according to a first aspect of the present invention there is provided an image retrieval system which includes hand-held information equipment and an information processor having a character recognition function, wherein the hand-held information equipment comprises a data storage unit which stores, on an image-to-image basis, image data including read images of an image reader; a retrieval data creation requesting unit which reads image data from the data storage unit, for sending to the information processor, to make a request to create text data for retrieval; and a retrieval data entry unit which, after receipt of the request, combines the text data for retrieval received from the information processor with the image data, for entry into the data storage unit, and wherein the information processor comprises a character recognition unit which recognizes characters contained in image data received from the hand-held information equipment, the character recognition unit converting the characters into text data, for sending to the hand-held information equipment. Herein, the hand-held information equipment further comprises a retrieval unit which retrieves image data conforming to a specified keyword and retrieval conditions through reference to texts or indexes stored in the data storage unit. The information processor further comprises an index creation unit which creates indexes for retrieval from the text data converted by the character recognition unit, for sending to the hand-held information equipment, and the retrieval data entry unit of the hand-held information equipment combines the index received from the information processor with the image data for retrieval, for entry into the data storage unit. In this manner, the hand-held information equipment having no function to create retrieval information such as text data and indexes required for the keyword retrieval is connected to the personal computer or other information processor so that retrieval information is created and returned to the hand-held information equipment for storage together with the images, whereupon the present invention enables the texts and indexes for retrieving images including documents stored in the hand-held information equipment to simply and easily be created. Furthermore, the text data converted by character recognition on the information processor side are transferred to the hand-held information equipment for entry in combination with the corresponding image data so that desired images can be retrieved through keyword input on the hand-held information equipment for full-sentence retrieval of the text including the keyword. Furthermore, the indexes are entered in combination for retrieval into the data storage unit so that desired image data can be retrieved at a higher speed than the case of full-sentence retrieval through input of a keyword on the hand-held information equipment to retrieve indexes conforming to the keyword. The information processor further comprises a remote retrieval unit which sends the specified keyword and retrieval conditions to the hand-held information equipment, the remote retrieval unit receiving image data conforming to the keyword and retrieval conditions. In this manner, with the hand-held information equipment connected to the information processor, the keyword is sent from the information processor to the hand-held information equipment so as to receive the results of retrieval effected within the hand-held information equipment so that the information processor side can retrieve images stored in the hand-held information equipment. Provided that, upon retrieval, the hand-held information equipment includes image data having no text data or indexes for retrieval entered, the remote retrieval unit acquires the image data to create text data or indexes to make a retrieval and sends the text data or indexes to the hand-held information equipment to make an entry. In this case, provided that on the hand-held information equipment side there lie scattered image data having no text data and indexes for retrieval entered, the keyword retrieval is infeasible, and hence the information processor creates and retrieves the texts and indexes without waiting for the request from the hand-held information equipment so that the keyword-based image retrieval can be effected without being conscious of the presence or absence of the retrieval information on the hand-held information equipment side. The information processor further comprises a connection detecting unit which detects a connection and a disconnection between the information processor and the hand-held information equipment, to provide a control of start and end of creation of the text data and indexes for retrieval. This enables images having no retrieval information entered to automatically be selected to create retrieval information for each connection of the hand-held information equipment to the information processor, thereby eliminating the need for the user's instruction on the images free from retrieval information.

To achieve the above object, according to a second aspect of the present invention there is provided an image retrieval method using hand-held information equipment provided at least with an image reader and using an information processor provided at least with a character recognition function, wherein the hand-held information equipment reads image data stored and sends the image data to the information processor to make a request to create text data for retrieval, and wherein characters contained in image data received from the hand-held information equipment are converted into text data through character recognition of the information processor, the text data being sent to the hand-held information equipment, and wherein the text data received from the information processor are combined with the image data, for retrieval, to make an entry.

The indexes for retrieval are created from the text data converted by the character recognition unit of the information processor and are sent to the hand-held information equipment. The hand-held information equipment combines the indexes received from the information processor with the image data, for retrieval, to make an entry. The hand-held information equipment further refers to text data or indexes entered, to retrieve image data conforming to a keyword and retrieval conditions specified. The information processor further sends a keyword and retrieval conditions specified to the hand-held information equipment and receives image data conforming to the keyword and retrieval conditions. Provided that, upon retrieval, the hand-held information equipment includes image data having no text data or indexes for retrieval entered, the information processor acquires the image data to create text data and/or indexes to make a retrieval and sends the text data or indexes to the hand-held information equipment to make an entry. The information processor further detects a connection and a disconnection between the information processor and the hand-held information equipment, to provide a control of start and end of creation of the text data and indexes for retrieval.

To achieve the above object, according to a third aspect of the present invention there is provided an image retrieval program executed by the hand-held information equipment side, the program allowing a computer of the hand-held information equipment to read image data stored and send the image data to an external information processor to make a request to create text data for retrieval, and after receipt of the request, and combine the text data received from the information processor with the image data, for retrieval, to make an entry. The image retrieval program further allows the computer to combine the indexes received from the information processor with the image data, for retrieval, to make an entry. The image retrieval program further allows the computer to refer to text data or indexes entered and retrieve image data conforming to a keyword and retrieval conditions specified.

To attain the above object, according to a fourth aspect of the present invention there is provided an image retrieval program executed by the information processor side, the program allowing a computer to convert characters contained in image data received from hand-held information equipment into text data for sending for retrieval and combine the text data with image data for entry. The image retrieval program further allows the computer to create indexes for retrieval from text data converted by character recognition and send the indexes to the hand-held information equipment for entry in combination for retrieval of the image data. The image retrieval program further allows the computer to send a keyword and retrieval conditions specified to the hand-held information equipment and receive image data conforming to the keyword and retrieval conditions. The image retrieval program further allows the computer, provided that, upon retrieval, the hand-held information equipment includes image data having no text data or indexes for retrieval entered, to acquire the image data to create text data and/or indexes to make a retrieval and send the text data or indexes to the hand-held information equipment to make an entry. The image retrieval program further allows the computer to detect a connection and a disconnection between the information processor and the hand-held information equipment, to provide a control of start and end of creation of the text data and indexes for retrieval.

BRIEF DESCRIPTION OF THE DRAWINGS

The above and other objects, aspects, features and advantages of the present invention will become more apparent from the following detailed description when taken in conjunction with the accompanying drawings, in which.

DETAILED DESCRIPTION OF THE PREFERRED EMBODIMENT

Figure 1:
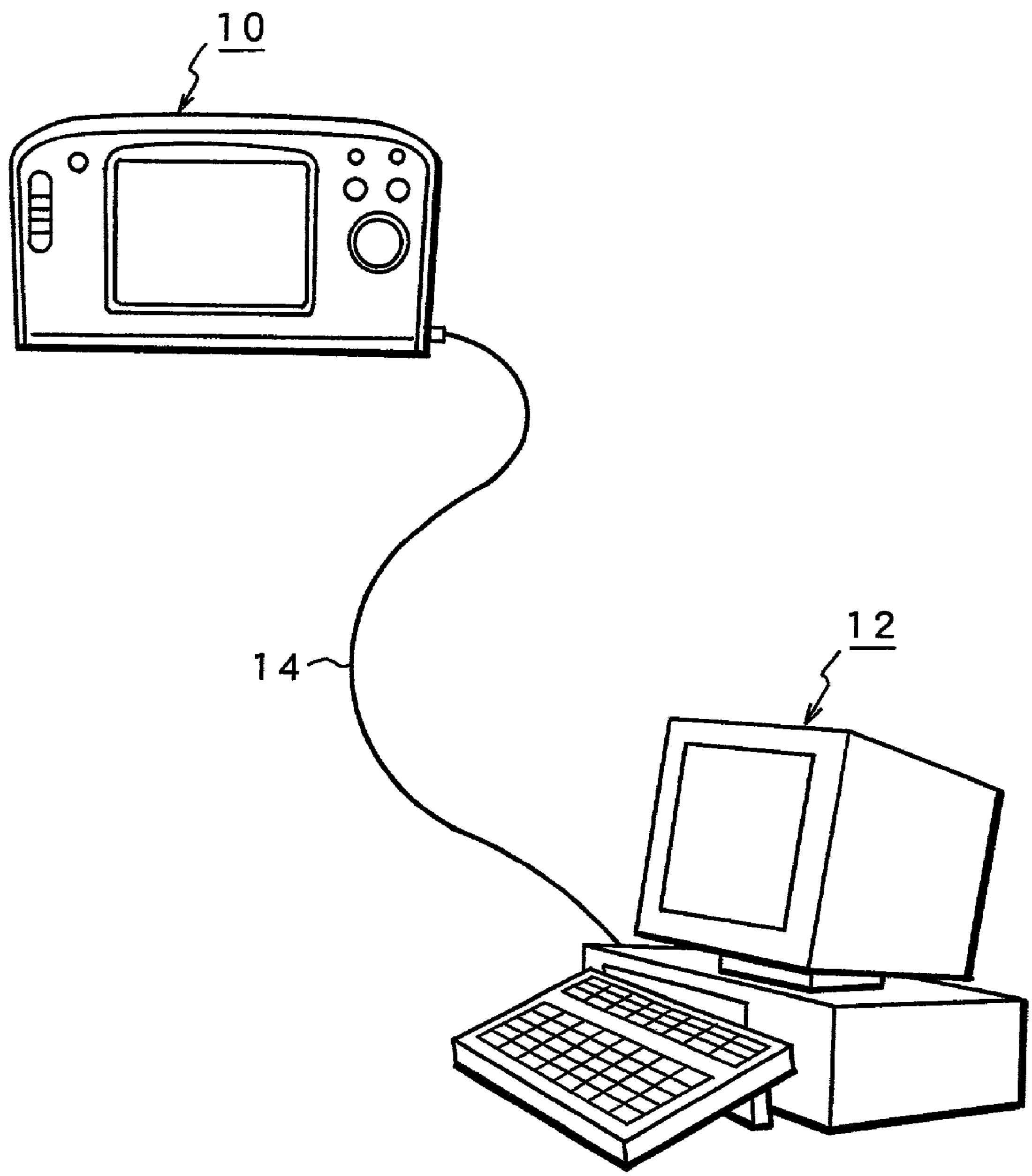
FIG. 1 is an explanatory diagram of an embodiment of the present invention in which a hand-held information equipment and an information processor are in connection with each other.

FIG. 1 is an explanatory diagram of an embodiment of an image retrieval system in accordance with the present invention. The image retrieval system of the present invention comprises hand-held information equipment 10 and an image processor 12 in the form of, e.g., a personal computer. The hand-held information equipment 10 is small-sized, lightweight and handy equipment having an image reader incorporated integrally therein. The hand-held information equipment 10 stores images read by the incorporated image reader, so as to be able to provide a display of the stored images as the need arises. The hand-held information equipment 10 is ordinarily separated from the information processor 12 and is carried by the user for use. Upon creation of text data and indexes for retrieval of the image data stored in the hand-held information equipment 10, it is connected via a connection cable 14 to the information processor 12 as seen in the diagram. The information processor 12 may be operated to retrieve and display the image data stored in the hand-held information equipment 10.

Figure 2:
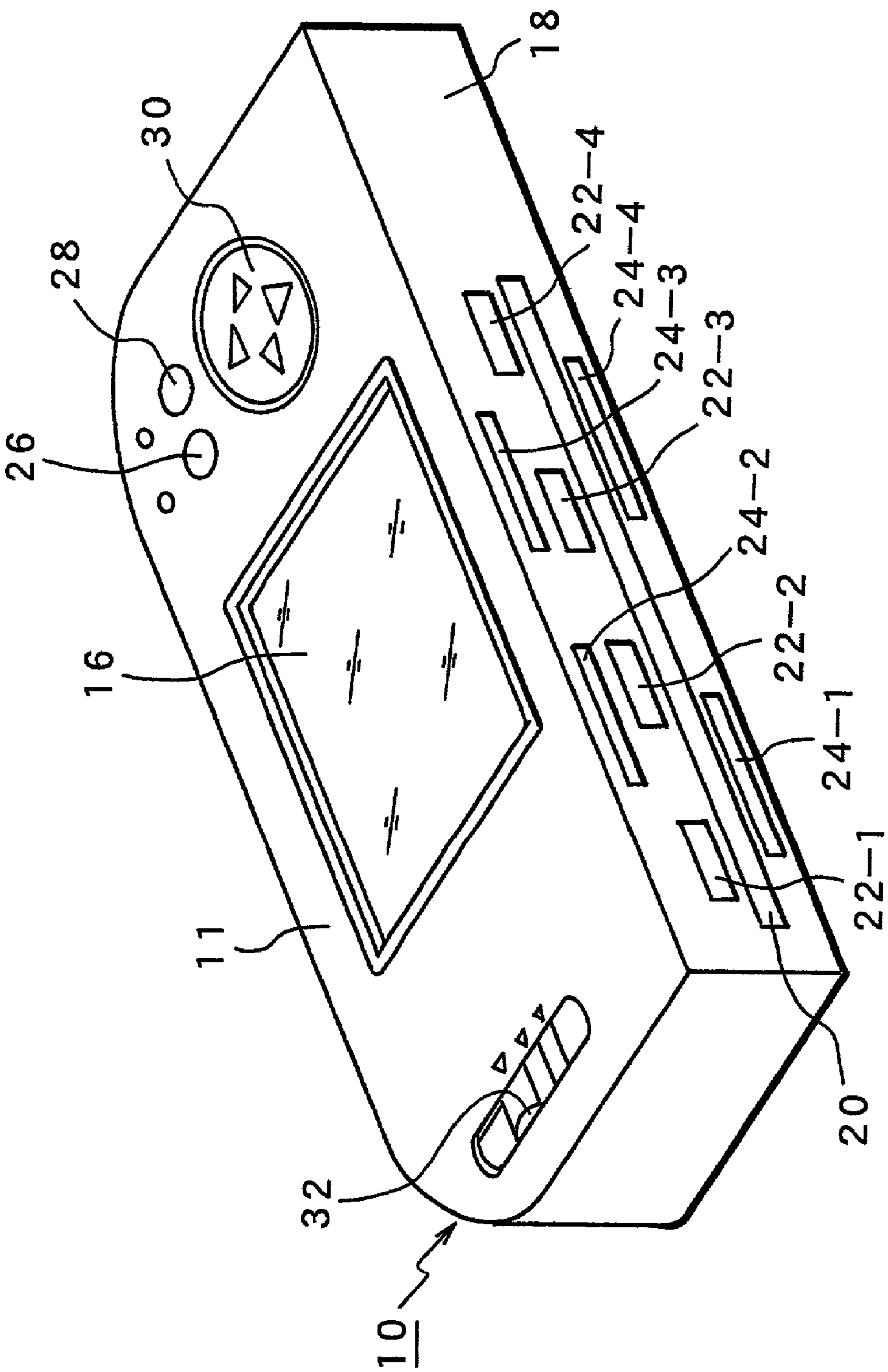
FIG. 2 is an explanatory diagram of the hand-held information equipment of FIG. 1.

FIG. 2 is an explanatory diagram of the hand-held information equipment 10 used in FIG. 1. The hand-held information equipment 10 comprises a body casing 11 which includes a liquid crystal display 16 with touch panel formed on the front surface of the body casing 11 and which includes a read surface 18 extending orthogonal to the front surface. The read surface 18 includes a read window 20 whose interior is provided with an optical read mechanism having a CCD line sensor and an LED array as a light source. The read window 20 has a transverse width corresponding to A4 size (105 mm×148 mm), e.g., a width slightly larger than 105 mm. Main rollers 22-1 to 22-4 are arranged at four sites along the read window 20 and fitted to a shaft within the body casing 11 so that a rotary encoder coupled to the shaft is driven by rotations of the main rollers 22-1 to 22-4 based on the read operation. Auxiliary rollers 24-1 to 24-4 are arranged at four sites in order to balance the body casing 11 when the read surface 18 is placed on a manuscript. The front surface of the body casing 11 having the liquid crystal display 16 with touch panel is provided with a power switch 26, a cancel switch 28, a four-directional switch 30 and a selection slide switch 32. When the power switch 26 is acted on, the power supply of the hand-held information equipment 10 turns on, allowing a menu screen to appear on the liquid crystal display 16. The menu screen corresponds to one of selection modes such as read, retrieval and display, selected by use of the selection slide switch 32. Menu items appearing on the liquid crystal display 16 are acted on with a touch pen not shown so that required operations can be carried out. The four-directional switch 30 is used to designate, e.g., the erect direction which represents the top in the read image display state, upon the read operation with the read surface 18 having the read window 20 placed on the manuscript. The details of the hand-held information equipment 10 are known from, e.g., Japan Patent Laid-open Pub. No. 2000-201261.

Figure 3A:
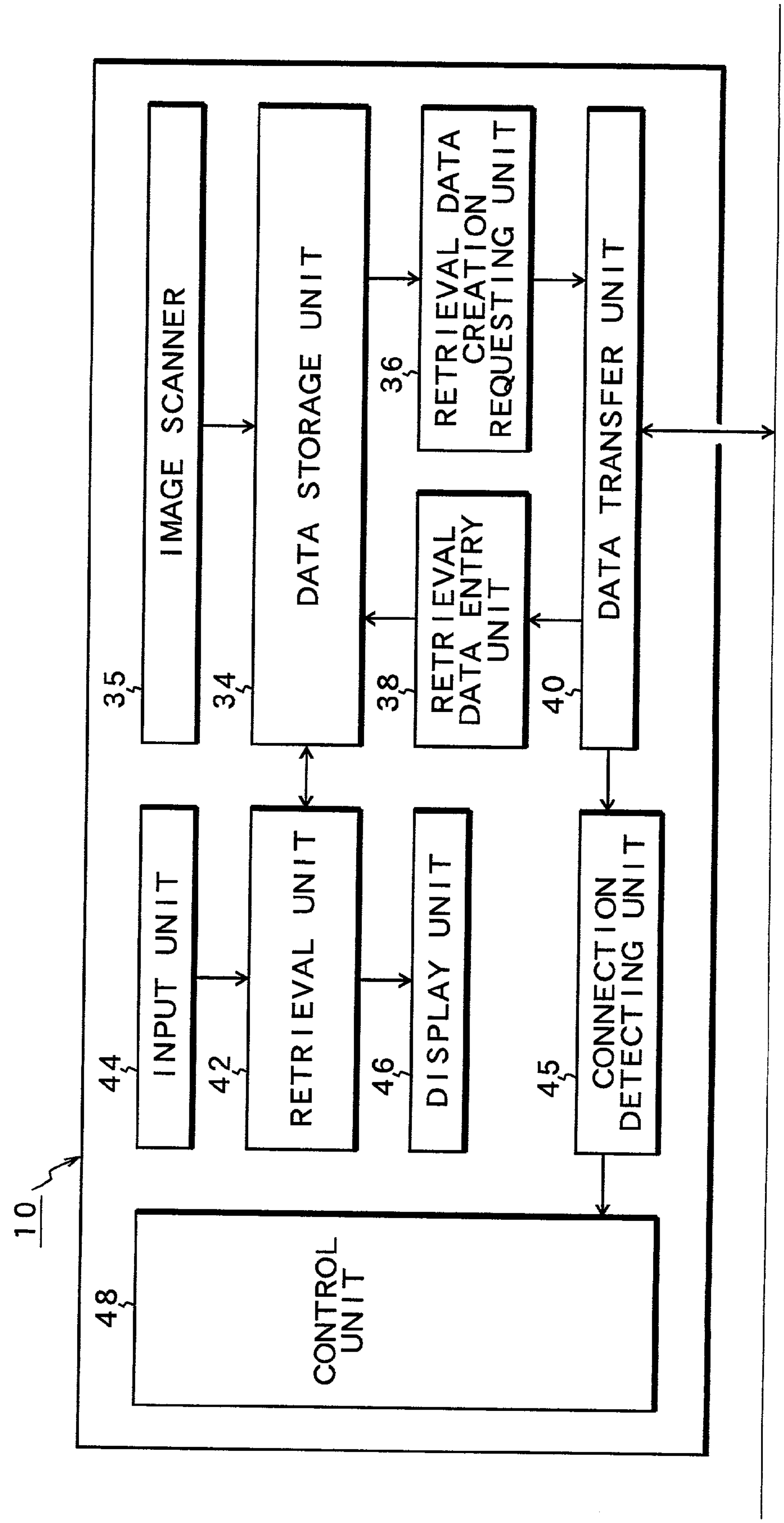
FIGS. 3A and 3B are block diagrams of the functional configuration of the hand-held information equipment and the information processor, respectively, of FIG. 1.
Figure 3B:
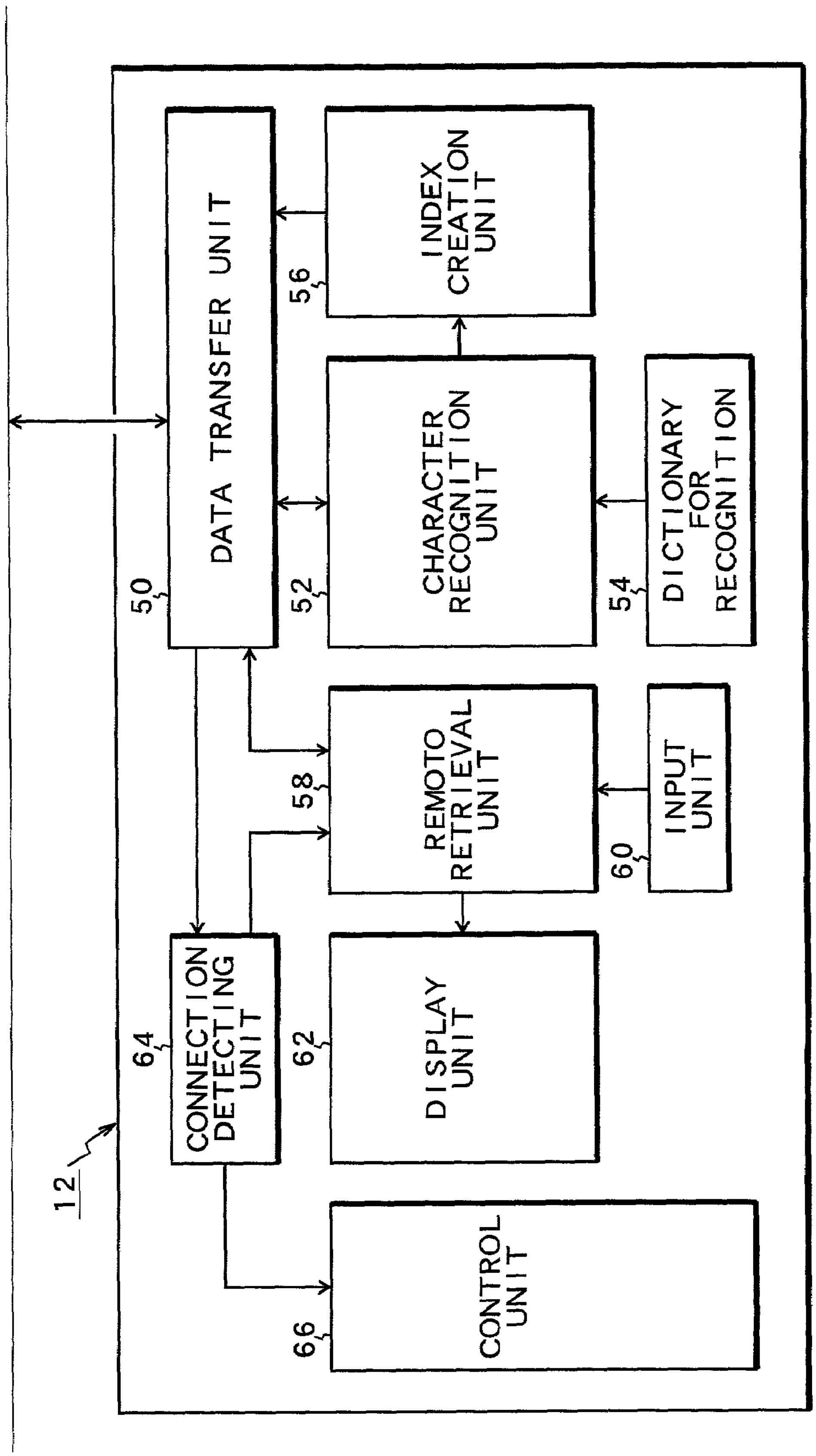

FIGS. 3A and 3B are block diagrams of processing functions effected by the hand-held information equipment 10 and the information processor 12 using a microcomputer in the image retrieval system of the present invention. The hand-held information equipment 10 comprises a data storage unit 34, an image scanner 35 making up the image reader, a retrieval data creation requesting unit 36, a retrieval data entry unit 38, a data transfer unit 40, a retrieval unit 42, an input unit 44, a display unit 46 and a control unit 48. On the other hand, the information processor 12 comprises a data transfer unit 50, a character recognition unit 52, a dictionary 54 for recognition, an index creation unit 56, a remote retrieval unit 58, an input unit 60, a display unit 62, a connection detecting unit 64 and a control unit 66. The data storage unit 34 of the hand-held information equipment 10 stores e.g., image data read by the image scanner 35. The image data stored in the data storage unit 34 are various types of image data which include photographs, graphics, documents, or photographs and documents, and which are stored on an image-to-image basis. Herein, a single piece of image data stored in the data storage unit 34 is used as page data. Entered into the page data is a combination of the image data fetched by, e.g., the image scanner 35 and the text data and indexes for retrieval acquired by the request for creation to the information processor 12.

Figure 4:
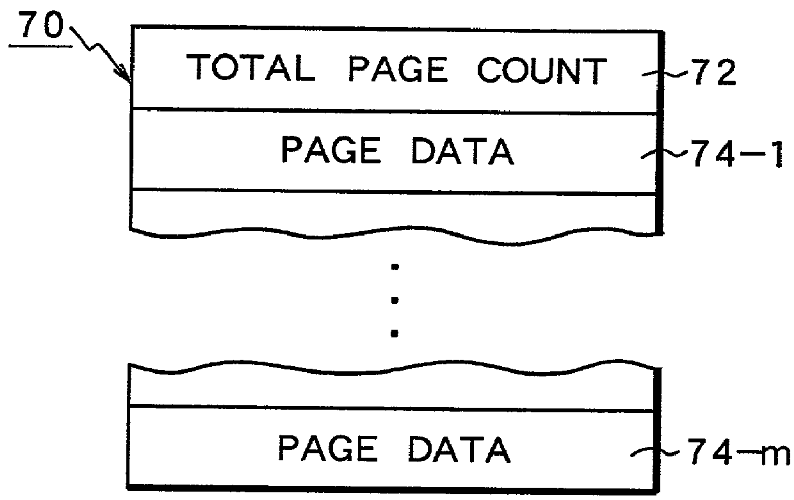
FIG. 4 is an explanatory diagram of the structure of image data stored in the hand-held information equipment of FIG. 3A.

FIG. 4 is an explanatory diagram of a data structure 70 of the image data stored in the data storage unit 34 of the hand-held information equipment 10 of FIG. 3. In the data structure 70, total page count 72, i.e., the total number of pages stored is located at the forefront, which is followed by image data for m pages from page data 74-1 to **74-*m*. The page data 74-1 to 74-*m* each have a data structure represented by the page data 74-1 of FIG. 5. The page data 74-1 store, in the mentioned order, page number 76 at the topmost position, image data 78, text data 80 for retrieval, index count 82, i.e., the number of indexes which are entered as indexes for retrieval, and n indexes 84-1 to 84-*n*** for retrieval at the bottommost position.

Figure 5:
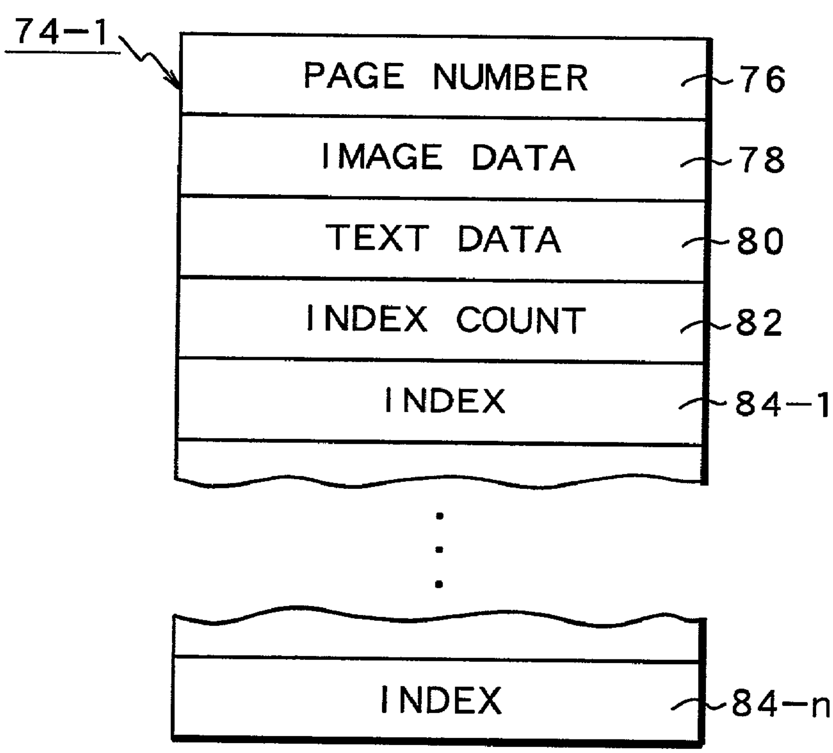
FIG. 5 is an explanatory diagram of page data of FIG. 4.
Figure 6:
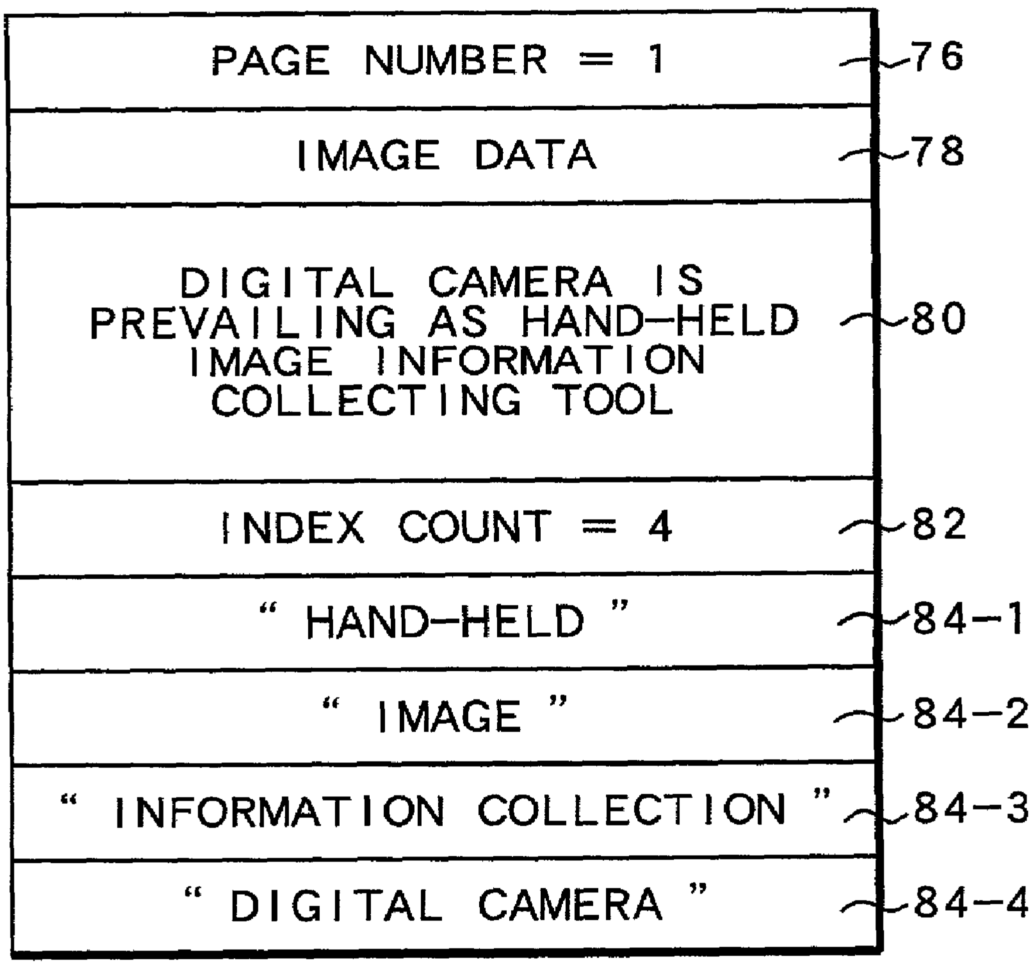
FIG. 6 is an explanatory diagram of specific contents of the page data of FIG. 5.

FIG. 6 shows specific data contents of the page data 74-1 of FIG. 5. In the data contents of the page data 74-1, "1" is stored as the page number 76, with the image data 78 which follow. The image data 78 may be black-and-white binary data or color data such as RGB. The next text data 80 store a text sentence that "digital camera is prevailing as hand-held image information collecting tool" acquired by the character recognition of characters included in the image data 78. The next index number 82 stores "4" for example. The indexes 84-1 to 84-4 store, as the indexes extracted from the text sentence of the text data 80, nouns extracted from the text sentence for entry as the indexes, i.e., "hand-held", "image", "information collection" and "digital camera" in this example.

Referring again to FIGS. 3A and 3B, the retrieval data creation requesting unit 36 of the hand-held information equipment 10 transfers to the information processor 12 image data having no text data and indexes entered within the data storage unit 34 in the state where the hand-held information equipment is connected via the cable 14 to the information processor 12, for request for the creation of the retrieval data. More specifically, this request for creation of the retrieval data is carried out in response to a start instruction issued from the control unit 48 when the connection with the information processor 12 is detected by the connection detection unit 45. The processing is terminated on receipt of an end instruction issued from the control unit 48 on the basis of detection by the connection detection unit 45 of disconnection from the information processor 12. The retrieval data entry unit 38 enters the text data and indexes received from the information processor 12, as the result of response to the request from the retrieval data creation requesting unit 36, into corresponding image data of the data storage unit 34 in the data format of FIGS. 5 and 6. In the retrieval mode of the hand-held information equipment 10, the retrieval unit 42 retrieves image data conforming to the keyword and the retrieval conditions input from the input unit 44, through keyword-based reference to image data stored in the data storage unit 34. In this case, the retrieval effected by the retrieval unit 42 includes a text retrieval and an index retrieval. The text retrieval includes retrieving image data having text data conforming to the full sentence of the input keyword. The index retrieval includes retrieving image data having a keyword conforming to the input keyword. "AND" or "OR" about a plurality of keywords is designated as the retrieval conditions for the retrieval unit 42. The input unit 44 selects the retrieval mode by use of the selection slide switch 32 to allow the menu screen to appear on the liquid crystal display 16 with touch panel as seen in FIG. 2, and selects the input of the keyword on the menu screen to perform the retrieval. The image data retrieved by the retrieval unit 42 are displayed on the display unit 46, i.e., on the liquid crystal display 16 with touch panel of FIG. 2. In this case, if a plurality of results of retrieval are present, the display unit displays that there are a plurality of candidate images, to allow the retrieval image to switchingly be displayed by the user.

Description will then be made of the information processor 12 side of FIG. 2. When the connection detecting unit 64 of the information processor 12 detects by way of the data transfer unit 50 that the hand-held information equipment 10 has been connected via the cable 14 thereto, the connection detecting unit 64 of the information processor 12 activates as an application by the control unit 66 the image retrieval processing, more specifically, the image retrieval program of the information processor installed in the information processor 12. When the control unit 66 starts the image retrieval, the information processor 12 executes the conversion to text data and creation of indexes by character recognition based on the request to create the retrieval information from the hand-held information equipment 10. More specifically, in response to detection of connection, the hand-held information equipment 10 posts information processor 12 on the page count of the image data stored in the data storage unit 34. When the page count of the image data is recognized, the control unit 66 asks each page data in turn on a page-to-page basis by way of the data transfer unit 50 whether the retrieval data, i.e., the text data or the index data have already been entered or not. If no retrieval data are entered, then the control unit 66 allows the image data to be transferred to the information processor 12. Upon receipt of the image data from the hand-held information equipment 10, the character recognition unit 52 extracts character data contained in the received image data, to convert it into text data by use of the dictionary 54 for recognition. The text data converted by the character recognition unit 52 are transferred from the data transfer unit 50 to the hand-held information equipment 10 and are entered by the retrieval data entry unit 38 into corresponding image data of the data storage unit 34 with the structure of the text data 80 as in FIG. 5. The index creation unit 56 is posted on the text data converted by the character recognition unit 52 and extracts, e.g., nouns contained in the text data. The index creation unit 56 then transfers the extracted ones as indexes to the hand-held information equipment 10 and allows the retrieval data entry unit 38 to enter the index count 82 and the indexes 84-1 to **84-*n* as in FIG. 5 into the corresponding image data of the data storage unit 34. The remote retrieval unit 58 of the information processor 12 sends the keyword input from the input unit 60 to the retrieval unit 42 of the hand-held information equipment 10 and retrieves the image data stored in the data storage unit 34 by use of the keyword specified by the information processor 12. The image data retrieved in response to the request from the information processor 12 are transferred to the information processor 12 for reception by the remote retrieval unit 58 to thereafter allow the display unit 62 to display the retrieved image. In case there exist image data having no text data and indexes entered as retrieval data among the image data stored in the data storage unit 34 when transferring the input keyword to make a request to retrieve the image data to the hand-held information equipment 10, the remote control unit 58 allows the hand-held information equipment 10 to transfer the image data having no text data and indexes for retrieval entered to the information processor 12. The information processor 12 creates the text data and indexes by means of the character recognition unit 52 and the index creation unit 56, retrieves image data with the created text data and indexes by means of the remote retrieval unit 58, and allows the display unit 62 to display the retrieved image data. After the completion of the retrieval, the information processor 12 transfers the text data and indexes created for retrieval to the hand-held information equipment 10 in which the image data entry unit 38 enters the text data and indexes created by the information processor 12 for the image data having no retrieval data entered. Naturally, the creation of the text data and indexes for retrieval by the transfer of the image data from the hand-held information equipment 10 to the information processor 12 may be made based on an input operation by the user in the hand-held information equipment 10**.

Figure 7A:
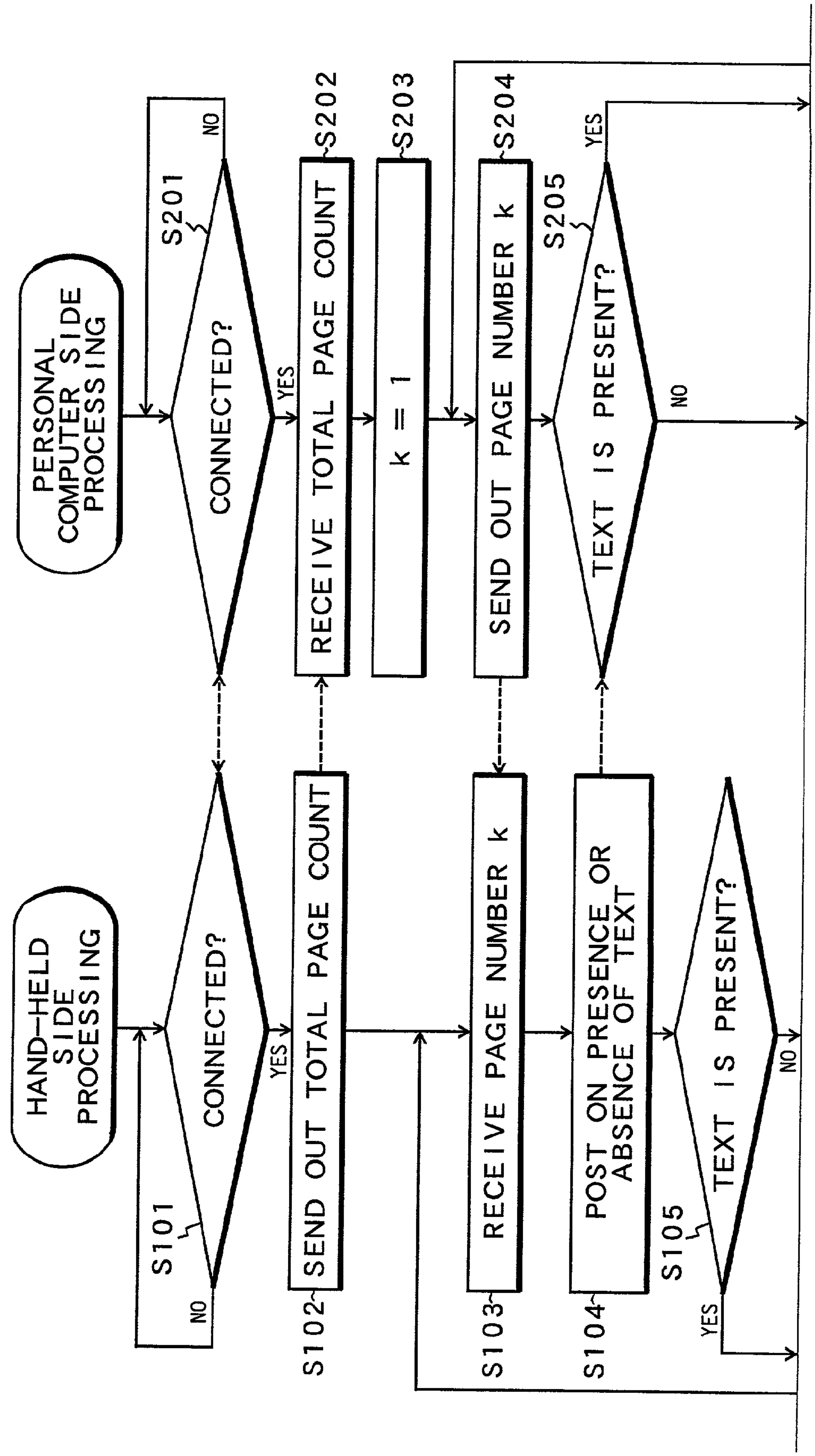
FIGS. 7A and 7B are flowcharts of text data creation processing effected in the present invention.
Figure 7B:
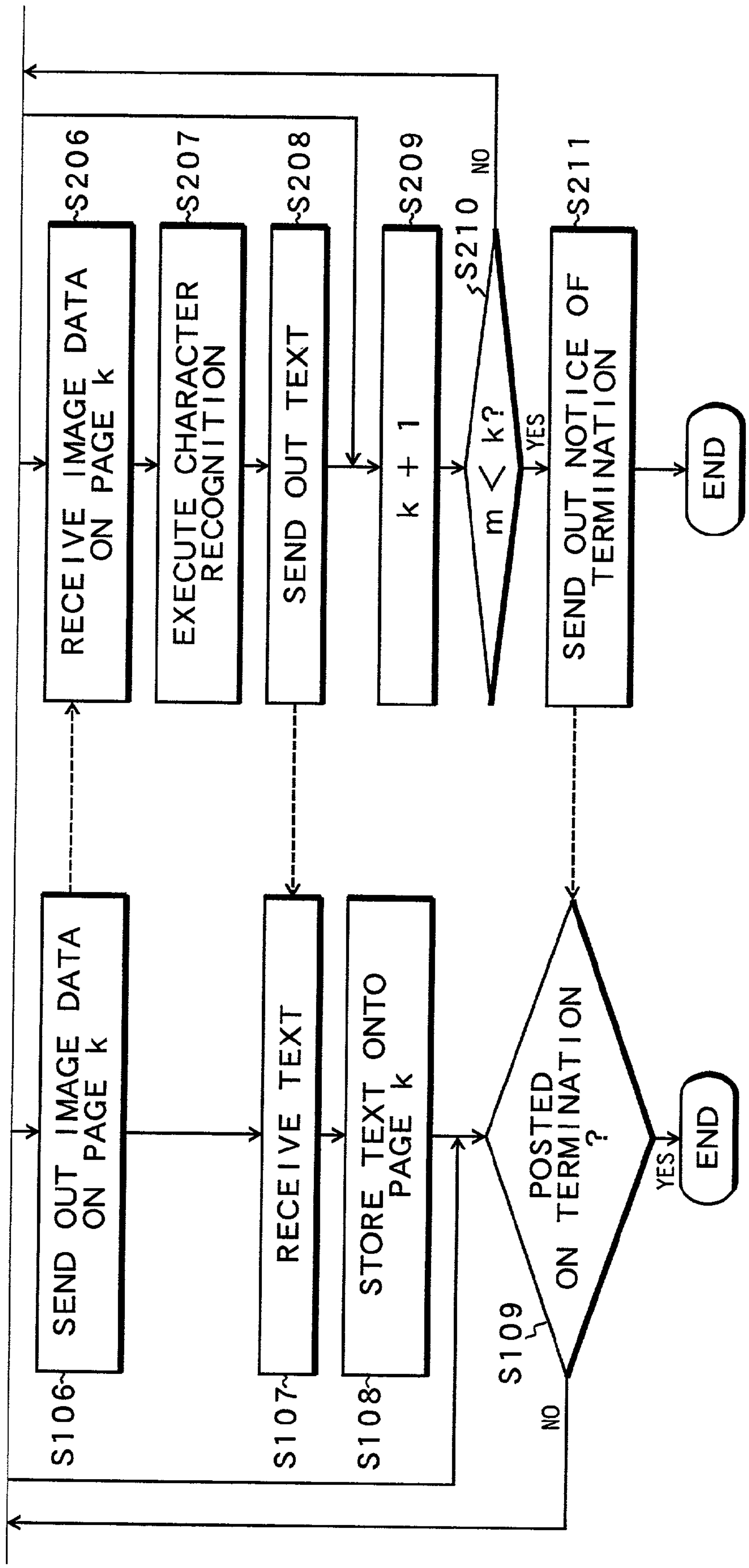

FIGS. 7A and 7B are flowcharts representing, in the form of respective operations and transfer-based interchanges, the hand-held side processing of the hand-held information equipment 10 of FIG. 3A and the personal computer side processing of the information processor 12 of FIG. 3B in the retrieval text data creation processing effected by the image retrieval system of the present invention. First, the hand-held information equipment 10 checks a connection with the information processor 12 in step S101, while similarly the information processor 12 checks a connection with the hand-held information equipment 10 in step S201. When the connection with the information processor 12 is judged in step S101 of the hand-held information equipment 10, the procedure goes to step S102 in which the hand-held information equipment 10 sends to the information processor 12 the foremost page count 72 in the storage data structure 70 of the data storage unit 34 of FIG. 4. The information processor 12 accepts the total page count of the image data sent from the hand-held information equipment 10 in step S02 and initializes the page number k to k=1 in step S203. Then, in step S204, the information processor 12 sends the page number k= 1 to the hand-held information equipment 10. The page number is received by the hand-held information equipment 10 in step S103 where the hand-held information equipment 10 refers to the page data of the page number k to post the information processor 12 whether the text data 80 exist among the page data. This post is judged in step S205 of the information processor 12, and if there are no text data, then the procedure goes to step S206. On the other hand, the hand-held information equipment 10 posts the information processor 12 on the presence or absence of the text data in step S104 and thereafter, if there are no text data in step S105, then transmits the image data having the page number k to the information processor 12 in step S106. In response to this, the information processor 12 accepts the image data having the page number k in step S206, executes the character recognition by the character recognition unit 52 for conversion into text data in step S207 and sends the thus converted text data to the hand-held information equipment 10 in step S208. The hand-held information equipment 10 accepts the text data sent from the information processor 12 in step S107 and stores the accepted text data into the page number k as the text data 80 of FIG. 5 in step S108. On the other hand, in the information processor 12 which has send the text data in step S208, the page number k is incremented by one in step S209, a check is made in step S210 to see if the page number k exceeds the total page count m on which the post has already been made, and if negative, then the procedure goes back to step S204 where the next page number k is sent to the hand-held information equipment 10 to repeat the same processings. If the page number k exceeds the total page count m in step S210, then the termination post is sent to the hand-held information equipment 10 in step S211. In response to this, the hand-held information equipment 10 accepts the termination post in step S109 to terminate a series of processings.

Figure 8A:
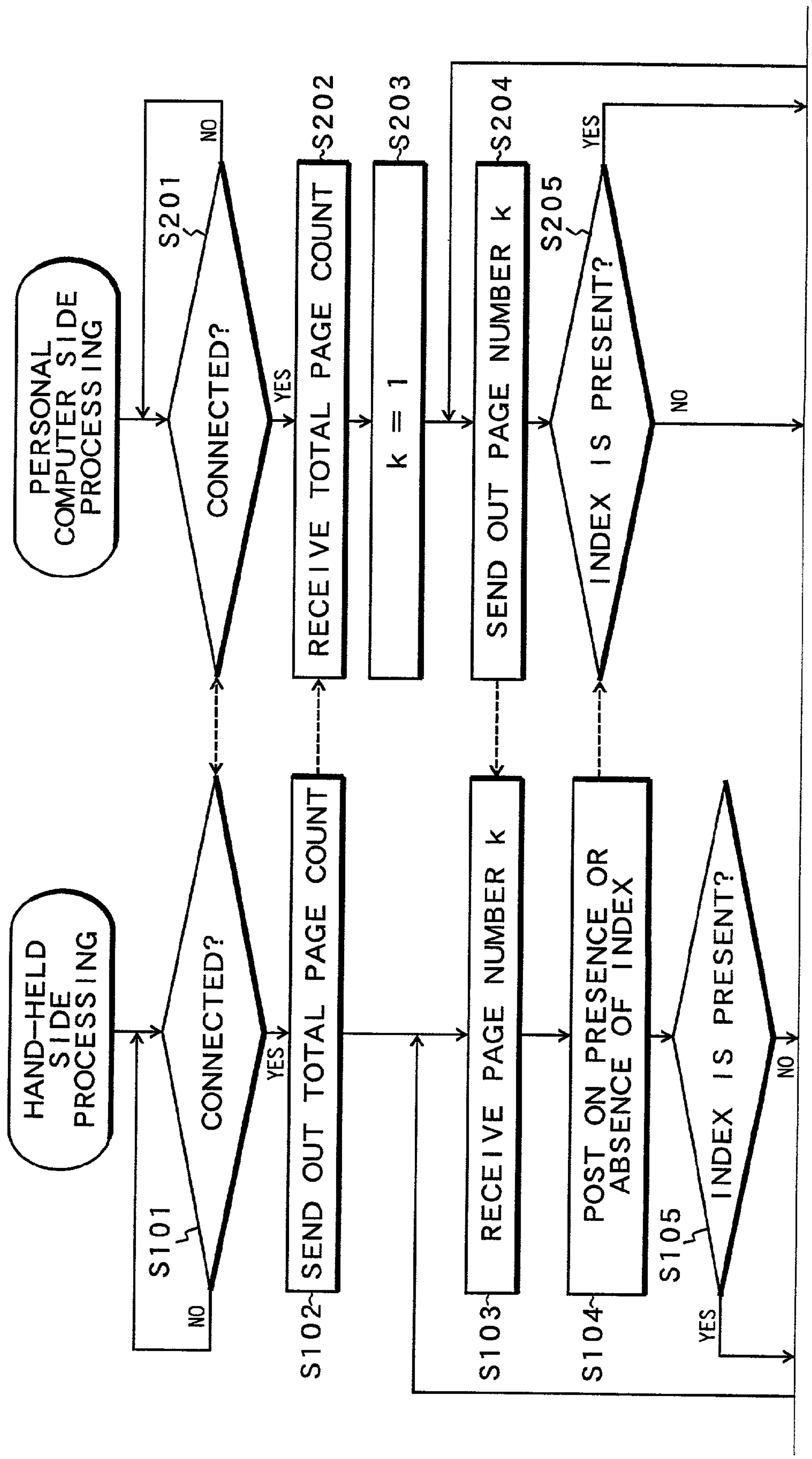
FIGS. 8A and 8B are flowcharts of index creation processing effected in the present invention.
Figure 8B:
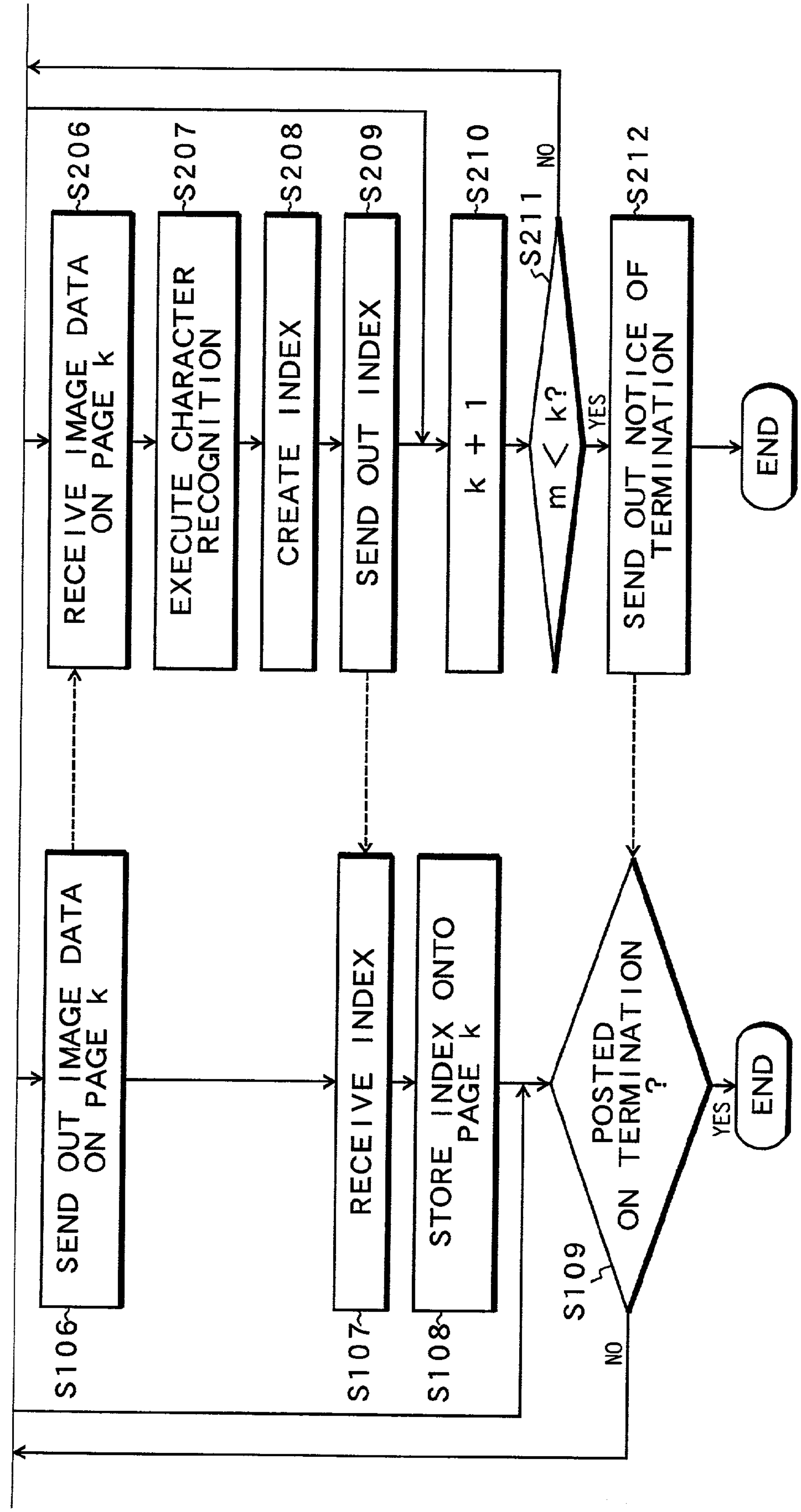

FIGS. 8A and 8B are flowcharts of the hand-held side processing effected by the hand-held information equipment 10 and the personal computer side processing effected by the information processor 12 for creating the indexes in the image retrieval system of the present invention. Steps S101 to S103 and S109 of this hand-held side processing are the same as those of the hand-held side processing of FIGS. 7A and 7B. Similarly, steps S201 to S204 and S210 to S212 of the personal computer side processing are the same as those of the personal computer side processing of FIGS. 7A and 7B. Thus, description is made of the processing proper to the index creation processing of FIGS. 8A and 8B as follows. When accepting the page number k in step S102, the hand-held information equipment 10 posts the information processor 12 on whether the image data contain entered indexes in step S104. If negative in step S105, then the hand-held information equipment 10 sends the image data of the page number k to the information processor 12 in step S106. When the information processor 12 judges the absence of the index from the post about the presence or absence of the index in step S205, the information processor 12 accepts the image data of the page number k being sent in succession in step S206 and executes the character recognition in step S207. The text data acquired from this character recognition are fed to the index creation unit 56 which in turn extracts e.g., nouns contained in the text sentence, to create indexes. The thus created indexes are sent to the hand-held information equipment 10 in step S209. In response to this, the hand-held information equipment 10 accepts the index in step S107 and stores the accepted indexes into the page number k in step S108 as in FIG. 6. Herein, either one of the creation of the text data of FIGS. 7A and 7B and the creation of the indexes of FIGS. 8A and 8B may selectively be made or both the text data and the indexes may simultaneously be created.

Figure 9:
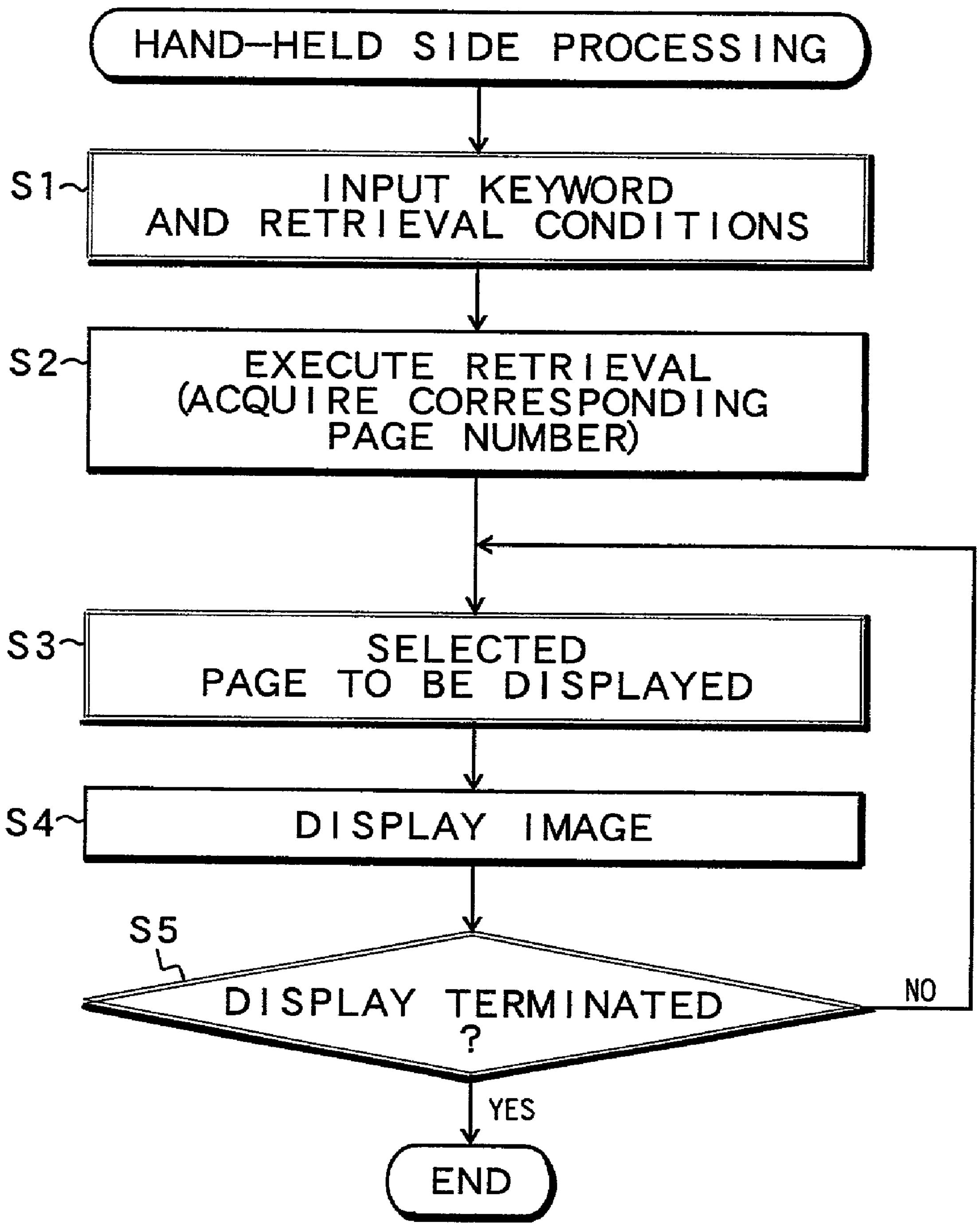
FIG. 9 is a flowchart of image retrieval processing effected by the sole hand-held information equipment of the present invention.

FIG. 9 is a flowchart of the image data retrieval processing effected solely by the hand-held information equipment 10, more specifically, by the retrieval unit 42 included in the hand-held information equipment 10 of FIG. 3A. In the flowchart of FIG. 9, the double frame represents the user input. First, in step S1, the user inputs a keyword and retrieval conditions. The keyword is input in the form of character input, with "AND" and "OR" specified as the retrieval conditions. Then the procedure goes to step S2 where the retrieval unit 42 executes the retrieval of the image data stored in the data storage unit 34 in conformity with the keyword and the retrieval conditions input. More specifically, the retrieval unit 42 retrieves, on a page-to-page basis, the page data 74-1 to **74-*m* of FIG. 4 stored in the data storage unit 34 to see if the text data 80 and the indexes 84-1 to 84-*n* contained in the respective page data conform to the keyword and the retrieval conditions as seen in FIG. 6, to create a list of coincident page numbers. Then in step S3, the page number acquired from the execution of retrieval is displayed on the screen of the display unit, to allow the user to select the page number for display. In response to this selection of the page number, the selected image appears on the screen of the display unit in step S4. Then the processings of steps S3 and S4 are iterated till the issuance of the user instruction to terminate the display in Step S5. In this manner, the image retrieval can be made from the retrieval text data and indexes under the support of the information processor 12**.

Figure 10:
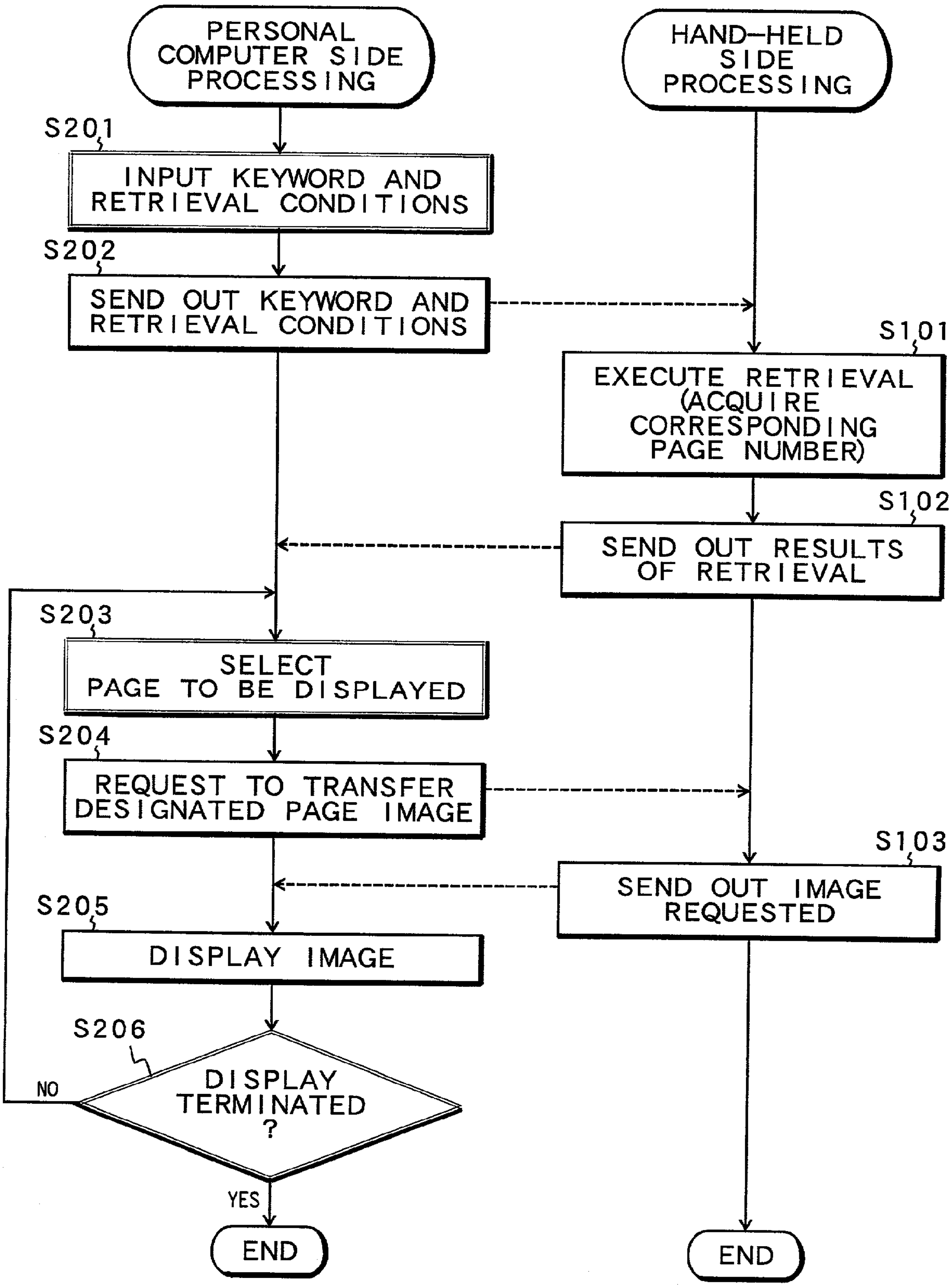
FIG. 10 is a flowchart of image retrieval processing effected from the information processor side of the present invention.

FIG. 10 is a flowchart of the retrieval processing, of the image data stored in the data storage unit 34 of the hand-held information equipment 10, effected by the remote retrieval unit 58 included in the information processor 12 of FIG. 3B. In the information processor 12 side, the user inputs a keyword and retrieval conditions in step S201. The input keyword and retrieval conditions are sent to the hand-held information equipment 10 in step S202. In the hand-held information equipment 10, the retrieval unit 42 sets text data or an index within the page data as the keyword and the retrieval conditions in step S101. Then, in step S102, the page number list acquired as the result of retrieval is sent to the personal computer 12. The information processor 12 displays on the display screen the page number list received as the result of retrieval from the hand-held information equipment 10 so that the user selects the page number in response to this. A request for the page number selected by the user is made in step S204 as an image transfer request for specified page to the hand-held information equipment 10. In response to this, the hand-held information equipment 10 sends the requested image data to the information processor 12 in step S103, in response to which the information processor 12 displays the received image in step S205. The processings of steps S203 to S205 are iterated till the issuance of an instruction to terminate the display by the user in step S206 so that the image data of the specified page can be received from the hand-held information equipment 10 for display.

According to the present invention as set forth hereinabove, it is possible even for the small-sized and lightweight hand-held information equipment which is difficult to be mounted with the character recognition function to readily acquire the text data and index for retrieval without inducing the increase of memory capacity and reduction of processing speed for character recognition, by the connection with the information processor such as a personal computer having a high processing performance so that the image data stored are transferred thereto for creation of text data and indexes from the character recognition and for reception for retrieval to enter them in combination with the image data. Furthermore, by storing the texts and indexes created by the information processor side into the hand-held information equipment together with the image data, it is possible to speed up the keyword retrieval of documentary images or of images containing documents and to ensure an effective utilization of a multiple pieces of image data fetched and stored in the hand-held information equipment. It is also possible to perform the image retrieval within the hand-held information equipment by not only the keyword retrieval of the image data by the sole hand-held information equipment but also by the information processor such as the personal computer creating the retrieval data, thus achieving an effective utilization of the image data stored in the hand-held information equipment.

Although the above embodiment has been directed by way of example to the hand-held information equipment integrally incorporating the image reader such as the image scanner, the image data fetch in the hand-held information equipment may be made from a memory card, a facsimile, an electronic mail, a digital camera, etc., other than the read by the image scanner. As long as it has a function to externally fetch and store the image data with any technique, the present invention is applicable to any hand-held information equipment without being limited to one integrally incorporating the image reader of this embodiment.

Although the above embodiment has been directed by way of example to the personal computer acting as the information processor equipped with the character recognition function, any other apparatus is available as long as it can have a character recognition function.

Although in the above embodiment the cable has been used to connect the hand-held information equipment with the information processor such as the personal computer, the connection therebetween may be achieved by way of a wireless circuit such as an infrared communication, a radio communication and cellular phones.

The present invention can include any appropriate variants without impairing its objects and advantages and is not limited by the numerical values indicated in the above embodiment.

What is claimed is:

1. An image retrieval system which includes hand-held information equipment and an information processor having a character recognition function, wherein said hand-held information equipment comprises:

a data storage unit which stores, on an image-to-image basis, image data including read images of an image reader;

a retrieval data creation requesting unit which reads image data from said data storage unit, for sending to said information processor, to make a request to create text data for retrieval; and a retrieval data entry unit which, after receipt of said request, combines said text data for retrieval received from said information processor with said image data, for entry into said data storage unit; and wherein said information processor comprises:

a character recognition unit which recognizes characters contained in image data received from said hand-held information equipment, said character recognition unit converting said characters into text data, for sending to said hand-held information equipment.

2. The system according to claim 1, wherein said information processor further comprises an index creation unit which creates indexes for retrieval from said text data converted by said character recognition unit, for sending to said hand-held information equipment, and wherein said retrieval data entry unit of said hand-held information equipment combines said index received from said information processor with said image data for retrieval, for entry into said data storage unit.

3. The system according to claim 2, wherein said hand-held information equipment further comprises a retrieval unit which retrieves image data conforming to a specified keyword and retrieval conditions through reference to texts or indexes stored in said data storage unit.

4. The system according to claim 3, wherein said information processor further comprises a remote retrieval unit which sends said specified keyword and retrieval conditions to said hand-held information equipment, said remote retrieval unit receiving image data conforming to said keyword and retrieval conditions.

5. The system according to claim 4, wherein provided that, upon retrieval, said hand-held information equipment includes image data having no text data or indexes for retrieval entered, said remote retrieval unit acquires said image data to create text data or indexes to make a retrieval and sends said text data or indexes to said hand-held information equipment to make an entry.

6. The system according to claim 2, wherein said information processor further comprises a connection detecting unit which detects a connection and a disconnection between said information processor and said hand-held information equipment, to provide a control of start and end of creation of said text data and indexes for retrieval.

7. An image retrieval method using hand-held information equipment provided at least with an image reader and using an information processor provided at least with a character recognition function, wherein said hand-held information equipment reads image data stored and sends said image data to said information processor to make a request to create text data for retrieval, and wherein characters contained in image data received from said hand-held information equipment are converted into text data through character recognition of said information processor, said text data being sent to said hand-held information equipment, and wherein said text data received from said information processor are combined with said image data, for retrieval, to make an entry.

8. The method according to claim 7, wherein said information processor further creates indexes for retrieval from said text data converted by said character recognition and sends said indexes to said hand-held information equipment, and wherein said hand-held information equipment combines said indexes received from said information processor with said image data, for retrieval, to make an entry.

9. The method according to claim 8, wherein said hand-held information equipment further refers to text data or indexes entered, to retrieve image data conforming to a keyword and retrieval conditions specified.

10. The method according to claim 9, wherein said information processor further sends a keyword and retrieval conditions specified to said hand-held information equipment and receives image data conforming to said keyword and retrieval conditions.

11. The method according to claim 10, wherein provided that, upon retrieval, said hand-held information equipment includes image data having no text data or indexes for retrieval entered, said information processor acquires said image data to create text data and/or indexes to make a retrieval and sends said text data or indexes to said hand-held information equipment to make an entry.

12. The method according to claim 8, wherein said information processor further detects a connection and a disconnection between said information processor and said hand-held information equipment, to provide a control of start and end of creation of said text data and indexes for retrieval.

13. A computer readable storage for controlling a computer and comprising an image retrieval program allowing a computer of a hand-held information equipment to:

read image data stored and send said image data to an external information processor to make a request to create text data for retrieval, and after receipt of said request, combine said text data received from said information processor with said image data, for retrieval, to make an entry;

allowing said computer to combine said indexes received from said information processor with said image data, for retrieval, to make an entry; and allowing said computer to refer to text data or indexes entered and retrieve image data conforming to a keyword and retrieval conditions specified.

14. A computer readable storage for controlling a computer and comprising a program for an information processor, said program allowing a computer to convert characters contained in image data received from hand-held information equipment into text data for sending for retrieval and combine said text data with image data for entry; allowing said computer to create indexes for retrieval from text data converted by character recognition and send said indexes to said hand-held information equipment for entry in combination for retrieval of said image data; and allowing said computer to send a keyword and retrieval conditions specified to said hand-held information equipment and receive image data conforming to said keyword and retrieval conditions.

15. The storage comprising the program according to claim 14, further allowing said computer, provided that, upon retrieval, said hand-held information equipment includes image data having no text data or indexes for retrieval entered, to acquire said image data to create text data and/or indexes to make a retrieval and send said text data or indexes to said hand-held information equipment to make an entry.

16. The storage comprising the program according to claim 14, further allowing said computer to detect a connection and a disconnection between said information processor and said hand-held information equipment, to provide a control of start and end of creation of said text data and indexes for retrieval.

* * * * *